(12) United States Patent
Susca et al.

(10) Patent No.: US 12,421,900 B2
(45) Date of Patent: Sep. 23, 2025

(54) VARIABLE DISPLACEMENT PUMP WITH BACK-UP

(71) Applicant: Hamilton Sundstrand Corporation, Charlotte, NC (US)

(72) Inventors: Ryan Prescott Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 180 days.

(21) Appl. No.: 18/084,993

(22) Filed: Dec. 20, 2022

(65) Prior Publication Data
US 2024/0200553 A1 Jun. 20, 2024

(51) Int. Cl.
| | |
|---|---|
| *F02C 7/236* | (2006.01) |
| *F02C 7/232* | (2006.01) |
| *F02C 9/30* | (2006.01) |
| *F04B 49/00* | (2006.01) |
| *F04B 49/08* | (2006.01) |

(52) U.S. Cl.
CPC .............. *F02C 7/236* (2013.01); *F02C 7/232* (2013.01); *F02C 9/30* (2013.01); *F04B 49/002* (2013.01); *F04B 49/007* (2013.01); *F04B 49/08* (2013.01); *F05D 2220/32* (2013.01); *F05D 2270/64* (2013.01)

(58) Field of Classification Search
CPC ........................ F04B 15/029; F04B 23/04–14; F04B 49/002; F04B 49/007; F04B 49/08; F04B 49/22; F02C 7/232; F02C 7/236; F02C 9/30; F05D 2220/32; F05D 2270/46; F05D 2270/64
See application file for complete search history.

(56) References Cited

U.S. PATENT DOCUMENTS 2,780,172 A * 2/1957 Coar ...................... F04C 14/02
417/286
3,841,089 A * 10/1974 Clark ........................ F02C 9/26
137/202
(Continued)

FOREIGN PATENT DOCUMENTS

EP 2609312 B1 * 10/2019 .............. F04B 23/04

OTHER PUBLICATIONS

Extended European Search Report dated Apr. 22, 2024, for corresponding European Patent Application No. 23218532.2.

*Primary Examiner* — Alexander B Comley
(74) *Attorney, Agent, or Firm* — Kinney & Lange, P.A.

(57) ABSTRACT

A system includes a variable displacement pump (VDP) with a pump inlet and a pump outlet. The VDP is configured to receive a flow at the pump inlet at a first pressure and to outlet a flow from the pump outlet at a second pressure elevated relative to the first pressure. A second pump is in fluid communication to receive flow at the pump inlet at the first pressure and to outlet flow from an auxiliary outlet. A backup selector is in fluid communication with the pump outlet and with the auxiliary outlet. The backup selector is configured to operate in a normal mode to supply the pump outlet from the VDP and to supply the auxiliary outlet from the second pump. The backup selector is configured to switch to a backup mode to supply the pump outlet from the second pump upon failure of the VDP.

20 Claims, 2 Drawing Sheets

(56) References Cited

U.S. PATENT DOCUMENTS

| | | | | |
|---|---|---|---|---|
| 5,118,258 A * | 6/1992 | Martin | | F02C 7/236 60/734 |
| 5,806,300 A * | 9/1998 | Veilleux, Jr. | | F02M 37/04 60/734 |
| 6,102,001 A * | 8/2000 | McLevige | | F02C 9/26 123/387 |
| 6,166,765 A | 12/2000 | Toyofuku | | |
| 6,487,847 B1 * | 12/2002 | Snow | | F02K 3/10 60/764 |
| 6,584,762 B2 | 7/2003 | Snow et al. | | |
| 6,651,441 B2 * | 11/2003 | Reuter | | F02C 7/32 417/292 |
| 7,770,388 B2 * | 8/2010 | Desai | | F02C 7/236 60/420 |
| 8,128,368 B2 | 3/2012 | Bielefedt | | |
| 8,128,378 B2 * | 3/2012 | Rowan | | F04B 1/26 60/734 |
| 8,166,765 B2 | 5/2012 | Baker et al. | | |
| 8,172,551 B2 * | 5/2012 | Baker | | F02C 7/236 417/213 |
| 8,192,172 B2 * | 6/2012 | Baker | | F02C 7/232 137/554 |
| 8,302,406 B2 | 11/2012 | Baker | | |
| 8,408,233 B2 * | 4/2013 | Reuter | | F02C 9/263 137/565.33 |
| 8,869,509 B2 * | 10/2014 | Baker | | F04B 49/22 60/424 |
| 9,574,500 B2 * | 2/2017 | Kelly | | F02C 9/263 |
| 9,617,923 B2 * | 4/2017 | Griffiths | | F02C 9/30 |
| 9,850,917 B2 * | 12/2017 | Mueller | | F15B 11/02 |
| 2003/0074884 A1 * | 4/2003 | Snow | | F02C 9/48 60/764 |
| 2005/0100447 A1 * | 5/2005 | Desai | | F04B 1/26 417/220 |
| 2010/0037867 A1 * | 2/2010 | Kleckler | | F02C 7/236 123/510 |
| 2010/0089025 A1 * | 4/2010 | Baker | | F02C 9/30 137/565.29 |
| 2010/0089026 A1 * | 4/2010 | Baker | | F02C 9/30 137/565.29 |
| 2012/0186673 A1 * | 7/2012 | Heitz | | F02C 7/232 137/565.15 |
| 2014/0196459 A1 * | 7/2014 | Futa | | F02C 7/22 60/734 |
| 2017/0292451 A1 * | 10/2017 | Reuter | | F02C 7/22 |
| 2017/0306856 A1 * | 10/2017 | Bickley | | F02C 7/236 |
| 2018/0340501 A1 * | 11/2018 | Ni | | F04B 49/08 |
| 2019/0112987 A1 * | 4/2019 | O'Rorke | | F02K 3/10 |
| 2020/0123986 A1 * | 4/2020 | Hahn | | G05D 7/0126 |
| 2020/0317361 A1 * | 10/2020 | Pess | | F23L 7/00 |
| 2021/0079848 A1 * | 3/2021 | Cocks | | F02C 7/236 |
| 2022/0307491 A1 * | 9/2022 | Rutar | | F04B 49/065 |

* cited by examiner

VARIABLE DISPLACEMENT PUMP WITH BACK-UP

BACKGROUND

1. Field

The present disclosure relates to pump systems, and more particularly to pump systems such as for used in aerospace applications for fuel control and hydraulics.

2. Description of Related Art

In order to minimize horsepower required for fuel pumping, variable displacement pumps (VDPs) are desirable. However, VDPs have higher part count than other pump types such as centrifugal pumps, so while VDPs can be made very reliable, they are not considered to be the most reliable type of pump. The reliability tradeoff of VDPs has heretofor driven some preclusions of their use in some applications, such as for single engine aircraft.

The conventional techniques have been considered satisfactory for their intended purpose. However, there is an ever present need for improved systems and methods for obtaining the horsepower benefits of VDPs without necessarily trading off reliability. This disclosure provides a solution for this need.

SUMMARY

A system includes a variable displacement pump (VDP) with a pump inlet and a pump outlet. The VDP is configured to receive a flow at the pump inlet at a first pressure and to outlet a flow from the pump outlet at a second pressure elevated relative to the first pressure. The VDP includes a variable displacement mechanism configured to vary the second pressure. A second pump is in fluid communication to receive flow at the pump inlet at the first pressure and to outlet flow from an auxiliary outlet. A backup selector is in fluid communication with the pump outlet and with the auxiliary outlet. The backup selector is configured to operate in a normal mode to supply the pump outlet from the VDP and to supply the auxiliary outlet from the second pump. The backup selector is configured to switch to a backup mode to supply the pump outlet from the second pump upon failure of the VDP.

The backup selector can include a selector valve (SV) connected in fluid communication with the auxiliary outlet and with a backup line, wherein the backup line is in fluid communication with the outlet line, wherein the selector valve is configured to block flow from the auxiliary outlet to the backup line in the normal mode, and to divert flow from the auxiliary outlet to the backup line in the backup mode.

The backup selector can include a backup line in fluid communication with the auxiliary outlet and with the pump outlet, wherein a check valve (CV) is included in the backup line, wherein the CV is configured to block flow through the backup line in the normal mode and to allow flow through the backup line in the backup mode.

An SCV can be included in the auxiliary outlet upstream of a backup line connecting for fluid communication between the auxiliary outlet and the pump outlet. An ejector can connect to the auxiliary outlet between the second pump and the SVC, wherein the ejector is also in fluid communication with the pump inlet through first line and with the backup line through a second line. An AFC (augmenter fuel control) can be in the auxiliary outlet downstream of the backup line.

The second pump can be a centrifugal pump. The auxiliary outlet can be configured to selectively supply an gas turbine engine augmenter in the normal mode. A pressure sensor can be operatively connected to the pump outlet to generate feedback indicative of the second pressure. A controller can be operatively connected to the pressure sensor and to the variable displacement mechanism for control of the VDP.

An output splitter can be configured to split flow from the pump outlet to a first outlet branch and to a second outlet branch for supplying two different systems each having a different pressure schedule. The first outlet branch can be connected to supply a hydraulic actuation system. The second outlet branch can be connected to supply a gas generating system.

The output splitter can be operatively connected to the controller, which can be configured to control the output splitter to regulate pressure in both of the first and second outlet branches. An electrohydraulic servo valve (EHSV) can include a first connection to the pump inlet, a second connection to the pump outlet, and a pump control line operatively connected to actuate the variable displacement mechanism. The controller can be operatively connected to control the EHSV to actuate the variable displacement mechanism based on feedback from the pressure sensor. The variable displacement mechanism can include a position sensor configured to generate feedback indicative of position of the variable displacement mechanism, wherein the controller is operatively connected to the position sensor to control the EHSV based on feedback from the position sensor. The controller can be configured control the output splitter to maintain a first pressure schedule of the first outlet branch higher than a second pressure schedule of the second outlet branch, wherein the first pressure schedule has a low pressure that is higher than a high pressure of the second pressure schedule.

The flow splitter can include a throttling metering system in the second outlet branch. The throttling metering system can include a metering valve (MV) connected to the second outlet branch to step down pressure from the pump outlet down to a third pressure below the second pressure. The MV can include a piston configured to meter flow from the second outlet branch to a line at the third pressure based on position of the piston in a valve sleeve.

An electrohydraulic control valve (EHSV) can be operatively connected to the controller, to the pump inlet, and to the pump outlet. The EHSV can include a first control line connected to a first end of the piston, and a second control line connected to a second end of the piston. The EHSV can be configured to pressurize the first and second control lines to control position of the piston based on commands from the controller. The MV can include a position sensor operatively connected to generate feedback indicative of position of the piston in the sleeve, wherein the controller is operatively connected to the position sensor to control the MV based on the feedback indicative of position of the piston in the sleeve.

The throttling metering system can include a pressure regulating valve (PRV) connected to a line at the third pressure from the MV to receive flow from the MV, and an outlet configured to output regulated pressure flow to a regulated pressure flow line based on position of a regulating piston in a regulating piston sleeve. A first end of the regulating piston can be connected to the line at the third pressure from the MV, and a second end of the regulating piston is connected to the pump outlet so position of the regulating piston in the regulating sleeve is based on pressure differential between the second and third pressures. A shutoff valve (SOV) can be connected in a line from the outlet of the PRV, wherein the SOV is configured to block flow from the PRV below a predetermined threshold for shutoff.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
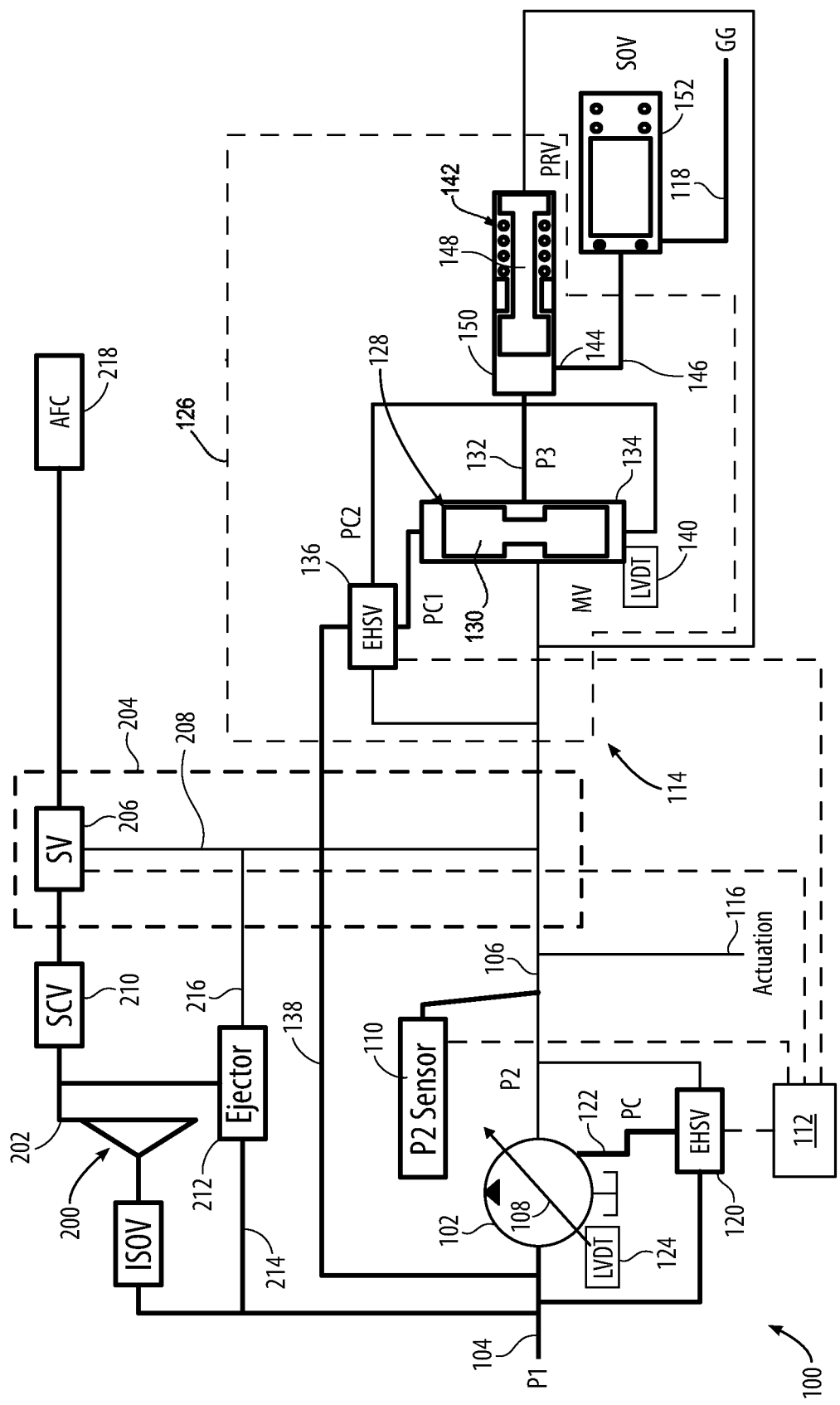
FIG. 1 is a schematic view of an embodiment of a system constructed in accordance with the present disclosure, showing a selector valve connected to control the backup line.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to provide backup capabilities for pump redundancy, e.g. enabling the benefits of variable displacement pumps (VDPs) in applications where traditionally VDPs could not be used.

The system 100 includes a variable displacement pump (VDP) 102 with a pump inlet 104 and a pump outlet 106. The VDP 102 is configured to receive a flow at the pump inlet 104 at a first pressure P1 and to outlet a flow from the pump outlet 106 at a second pressure P2 elevated relative to the first pressure P1. The VDP 102 includes a variable displacement mechanism 108 configured to vary the second pressure P2 given the first pressure P1.

A second pump 200 is in fluid communication to receive flow at the pump inlet 104 at the first pressure P1 and to outlet flow from an auxiliary outlet 202. A backup selector 204 is in fluid communication with the pump outlet 106 and with the auxiliary outlet 202. The backup selector 204 is configured to operate in a normal mode to supply the pump outlet 106 from the VDP 102 and to supply the auxiliary outlet 202 from the second pump 200. The backup selector 204 is configured to switch to a backup mode to supply the pump outlet 106 from the second pump 200 upon failure of the VDP 102.

The backup selector includes a selector valve (SV) 206 connected in fluid communication with the auxiliary outlet 202 and with a backup line 208, i.e. at a junction of the backup line 208 and the auxiliary outlet 202. The backup line 208 also has a junction where it connects with the pump outlet 106. The backup line 208 is in fluid communication with the pump outlet 106. The SV 206 is configured to block flow from the auxiliary outlet 202 to the pump outlet 106 in the normal mode, and to divert flow from the auxiliary outlet 202 to the pump outlet 106 in the backup mode. The SV is connected to the controller 112 for active control of the switching between normal and backup modes.

Figure 2:
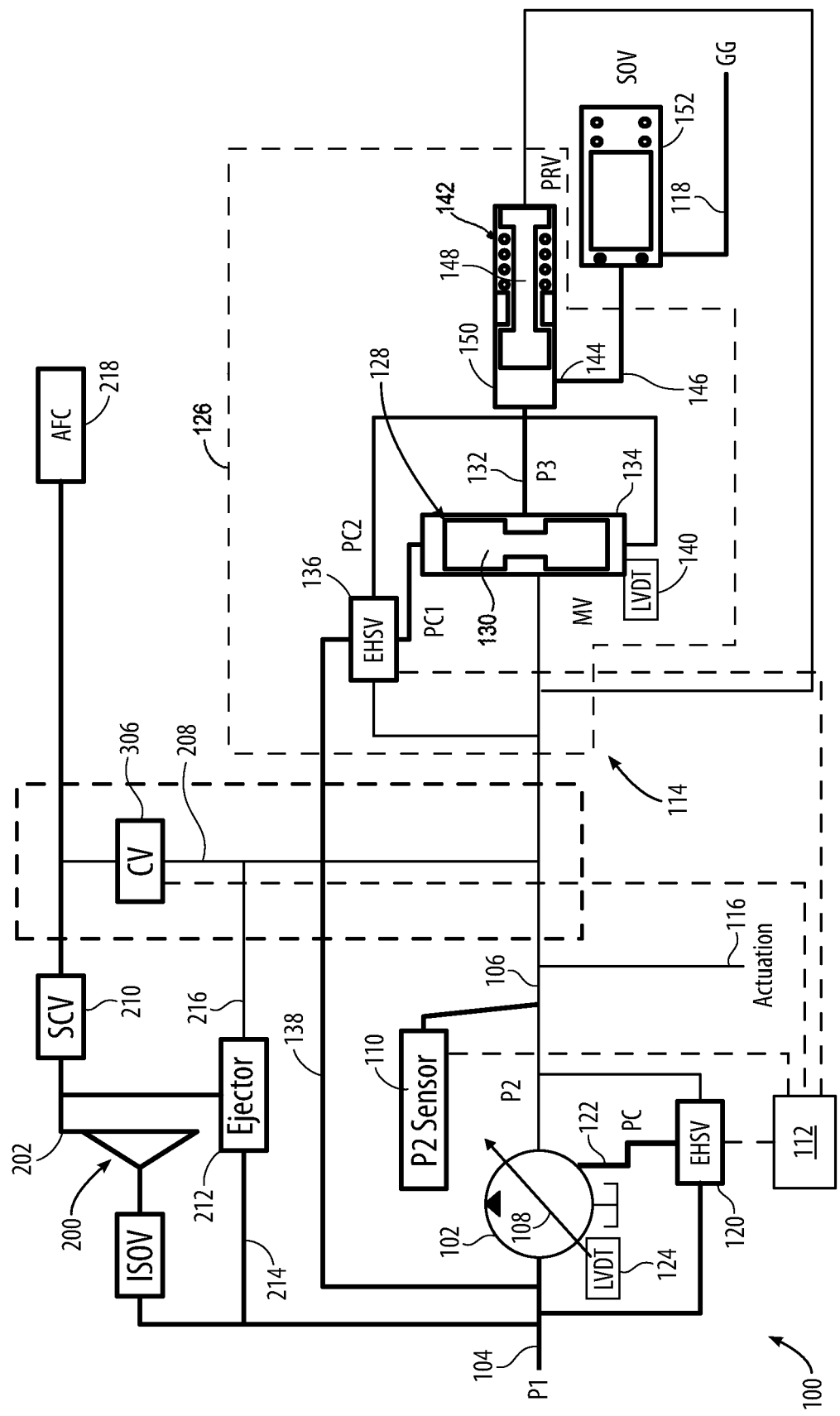
FIG. 2 is a schematic view of another embodiment of a system constructed in accordance with the present disclosure, showing a check valve in the backup line.

With reference to FIG. 2, it is also possible to configure system 100 for passive switching between the normal mode and the backup mode. If the output pressure schedule of the VDP 102, e.g. an actuation pressure schedule for the actuation branch of the pump outlet 106 for use in hydraulic actuators, is always above the pressure of the auxiliary line 202, the configuration in FIG. 2 can be used. The backup selector 204 in FIG. 2 includes the backup line 208 in fluid communication with the auxiliary outlet 202 and with the pump outlet 106, wherein a check valve (CV) 306 is included in the backup line 208 between the junctions of the backup line with the auxiliary outlet 202 and with the pump outlet 106. The CV 306 is configured to block flow through the backup line 208 in the normal mode, because the actuation pressure of the VDP output is higher than the pressure in the auxiliary line 202, which forces the CV 306 closed. The CV 306 allows flow through the backup line 208 in the backup mode because pressure in the auxiliary line is higher than in the pump outlet in the event of failure of the VDP 102. There can be a second CV (not pictured) in the line 106 between the outlet of the VDP 102 and the P2 sensor 110, oriented to prevent flow back into the VDP 102 during backup mode, which can be applied in both FIG. 1 and FIG. 2. This configuration in FIG. 2 would disable after burners in the back up mode to preserve function for the subsystems downstream of the outlet branches 116, 118, e.g. to preserve hydraulic actuation and gas generator functions in the event of failure of the VDP.

A stabilizing check valve (SCV) 210 is in the auxiliary outlet 202 upstream of the backup line 208 relative to flow from the second pump 200. The SCV 210 places an additional resistance on the outlet of the centrifugal pump to prevent continuing pressure oscillations, e.g. such as otherwise can occur when there is a big change in flow request downstream the pump and takes time to respond, then the downstream system responds to the pump change, which can cause another change to pump and so forth. An ejector 212 connects to the auxiliary outlet 202 between the second pump 200 and the SVC 210, wherein the ejector is also in fluid communication with the pump inlet 104 through first line 214 and with the backup line 208 through a second line 216. The ejector can evacuate fluid from the centrifugal pump when there is no demand for the pump, thus reducing pump power extraction to just what is required to overcome bearing friction, so no work is done by the pump. An AFC 218 (augmenter fuel control) is in the auxiliary outlet 202 downstream of the backup line 208, so the second pump, e.g. a centrifugal pump, can be used to selectively supply an augmenter of a gas turbine engine, for example, when the system 100 is in the normal mode.

A pressure sensor 110 is operatively connected to the pump outlet 106 to generate feedback indicative of the second pressure P2. A controller 112 is operatively connected to the pressure sensor 110, as indicated in FIG. 1 by the dashed line, and to the variable displacement mechanism 108 for control of the VDP 102.

An output splitter 114 is configured to split flow from the pump outlet 106 to a first outlet branch 116 and to a second outlet branch 118 for supplying two different systems each having a different pressure schedule. The output splitter 114 is operatively connected to the controller 112, which is configured to control the output splitter 114 to regulate pressure in both of the first and second outlet branches 116, 118. The first outlet branch 116 is connected to supply a hydraulic actuation system, for example. The second outlet branch is connected to supply a gas generating system, for example, where the liquid for both the hydraulic system and the gas generating system (e.g. a gas turbine engine) is fuel.

An electrohydraulic servo valve (EHSV) 120 includes a first connection to the pump inlet 104, a second connection to the pump outlet 106, and a pump control line 122 operatively connected to actuate the variable displacement mechanism 108. The controller 112 is operatively connected to control the EHSV 120 to actuate the variable displacement mechanism 108 based on feedback from the pressure sensor P2. The variable displacement mechanism 108 can include a position sensor 124, e.g. a linear variable displacement transistor (LVDT), configured to generate feedback indicative of position of the variable displacement mechanism 108. The controller 112 is operatively connected to the position sensor 124 to control the EHSV 120 based on feedback from the position sensor 124.

The controller 114 is configured to, e.g. by including or being connected to machine readable instructions configured to cause the controller to, control the output splitter 114 to maintain a first pressure schedule of the first outlet branch 116 higher than a second pressure schedule of the second outlet branch 118. The first pressure schedule can have a low pressure that is higher than the high pressure of the second pressure schedule, for example, or there can be some overlap.

The flow splitter 114 includes a throttling metering system 126 in the second outlet branch 118. The throttling metering system 126 includes a metering valve (MV) 128 connected to the second outlet branch 118 to step down pressure from the pump outlet 106 down to a third pressure P3 below the second pressure P2. The MV 128 includes a piston 130 configured to meter flow from the second outlet branch 118 to a line 132 at the third pressure P3 based on position of the piston 130 in a valve sleeve 134. A second EHSV 136 is operatively connected to the controller 112, as indicated by the dashed line in FIG. 1, to the pump inlet 104 via a line 138, and to the pump outlet 106 via the second outlet branch 118. The EHSV 136 includes a first control line PC1 connected to a first end of the piston 130, and a second control line PC2 connected to a second end of the piston 130. The EHSV 136 is configured to pressurize the first and second control lines PC1 and PC2 to control position of the piston 130 in its sleeve 134 based on commands from the controller 112.

The MV 128 includes a position sensor 140, e.g. an LVDT, operatively connected to generate feedback indicative of position of the piston 130 in the sleeve 134. The controller 112 is operatively connected to the position sensor 140, as indicated by the dashed line in FIG. 1, to control the MV 128 based on the feedback from the position sensor 140. The actuation system can drive the P2 schedule, the pump EHSV 120 will be commanded based on the differential between requested and actual P2 pressure. The EHSV 136 can have gains in the control logic that can be adjusted based on P2 pressure.

The throttling metering system 126 includes a pressure regulating valve (PRV) 142 connected to the line 132 at the third pressure P3 from the MV 128 to receive flow from the MV 128. The PRV 142 includes an outlet 144 configured to output regulated pressure flow to a regulated pressure flow line 146 based on position of a regulating piston 148 in a regulating piston sleeve 150 of the PRV 142. A first end of the regulating piston 148 is connected to the line 132 from the MV 128 at the pressure P3. A second end of the regulating piston 148 is connected to the pump outlet 106, at the pressure P2, so position of the regulating piston 148 in the regulating sleeve 150 is based on pressure differential between the second and third pressures P2 and P3, and a bias from a biasing member or spring acting on the piston 148.

A shutoff valve (SOV) 152 is connected in the line 146 from the PRV 142. The SOV 152 is configured to block flow from the PRV 142 below a predetermined threshold for shutoff of the gas generator or other system connected to be supplied from the second branch 118, based on pressure in the line 146 and based on a piston acted on by a biasing member or spring in the SOV 152.

Systems and methods as disclosed herein provide various potential benefits as follows. Systems and methods as disclosed herein can reduces the envelope required for pumping systems, can reduce the number of gear box drive pads required for pumps, can reduce pump count and/or part count, can allows VDP fuel systems to meet legacy engine reliability metrics. The systems and methods as disclosed herein can provide such benefits, even though the back-up pump horsepower extraction is relatively minimal when not operating, e.g. when the augmenter is not powered on during normal operation of the system 100, which is the majority of the time in normal missions.

The methods and systems of the present disclosure, as described above and shown in the drawings, provide for backup capabilities for pump redundancy, e.g. enabling the benefits of variable displacement pumps (VDPs) in applications where traditionally VDPs could not be used. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A system comprising:
    a variable displacement pump (VDP) with a pump inlet and a pump outlet, wherein the VDP is configured to receive a flow at the pump inlet at a first pressure and to discharge a flow from the pump outlet at a second pressure elevated relative to the first pressure, wherein the VDP includes a variable displacement mechanism configured to vary the second pressure;
    a second pump in fluid communication to receive flow at the pump inlet at the first pressure and to discharge flow from an auxiliary outlet;
    a backup selector in fluid communication with the pump outlet and with the auxiliary outlet,
    wherein the backup selector is configured to operate in a normal mode to supply the pump outlet from the VDP and to supply the auxiliary outlet from the second pump, and
    wherein the backup selector is configured to switch to a backup mode to supply the pump outlet from the second pump upon failure of the VDP;
    a stabilizing check valve (SCV) in the auxiliary outlet upstream of a backup line, the backup line providing fluid communication between the auxiliary outlet and the pump outlet;
    an ejector connecting to the auxiliary outlet between the second pump and the SCV, wherein the ejector is also in fluid communication with the pump inlet through a first line and with the backup line through a second line; and an augmenter fuel control (AFC) in the auxiliary outlet downstream of the backup line.

2. The system as recited in claim 1, wherein the backup selector includes a selector valve (SV) connected in fluid communication with the auxiliary outlet and with the backup line, wherein the backup line is in fluid communication with the pump outlet, wherein the selector valve is configured to block flow from the auxiliary outlet to the backup line in the normal mode, and to divert flow from the auxiliary outlet to the backup line in the backup mode.

3. The system as recited in claim 1, wherein the backup selector includes the backup line in fluid communication with the auxiliary outlet and with the pump outlet, wherein a check valve (CV) is included in the backup line, wherein the CV is configured to block flow through the backup line in the normal mode and to allow flow through the backup line in the backup mode.

4. The system as recited in claim 1, wherein the second pump is a centrifugal pump, and wherein the auxiliary outlet is configured to selectively supply a gas turbine engine augmenter in the normal mode.

5. The system as recited in claim 1, further comprising:
a pressure sensor operatively connected to the pump outlet to generate feedback indicative of the second pressure;
a controller operatively connected to the pressure sensor and to the variable displacement mechanism for control of the VDP; and
an output splitter configured to split flow from the pump outlet to a first outlet branch and to a second outlet branch for supplying two different systems each having a different pressure schedule, wherein the output splitter is operatively connected to the controller, which is configured to control the output splitter to regulate pressure in both of the first and second outlet branches.

6. The system as recited in claim 5, further comprising an electrohydraulic servo valve (EHSV), wherein the EHSV includes a first connection to the pump inlet, a second connection to the pump outlet, and a pump control line operatively connected to actuate the variable displacement mechanism.

7. The system as recited in claim 6, wherein the controller is operatively connected to control the EHSV to actuate the variable displacement mechanism based on feedback from the pressure sensor.

8. The system as recited in claim 7, wherein the variable displacement mechanism includes a position sensor configured to generate feedback indicative of position of the variable displacement mechanism, wherein the controller is operatively connected to the position sensor to control the EHSV based on feedback from the position sensor.

9. The system as recited in claim 7, wherein the output splitter includes a throttling metering system in the second outlet branch.

10. The system as recited in claim 9, wherein the throttling metering system includes:
a metering valve (MV) connected to the second outlet branch to step down pressure from the pump outlet down to a third pressure below the second pressure.

11. The system as recited in claim 10, wherein the MV includes a piston configured to meter flow from the second outlet branch to a line at the third pressure based on a position of the piston in a valve sleeve.

12. The system as recited in claim 11, further comprising:
a second electrohydraulic servo valve (EHSV) operatively connected to the controller, to the pump inlet, and to the pump outlet, wherein the second EHSV includes a first control line connected to a first end of the piston, and a second control line connected to a second end of the piston, wherein the second EHSV is configured to pressurize the first and second control lines to control position of the piston based on commands from the controller.

13. The system as recited in claim 12, wherein the MV includes a position sensor operatively connected to generate feedback indicative of position of the piston in the sleeve, wherein the controller is operatively connected to the position sensor to control the MV based on the feedback indicative of position of the piston in the sleeve.

14. The system as recited in claim 10, wherein the throttling metering system includes:
a pressure regulating valve (PRV) connected to a line at the third pressure from the MV to receive flow from the MV, and an outlet configured to output regulated pressure flow to a regulated pressure flow line based on position of a regulating piston in a regulating piston sleeve.

15. The system as recited in claim 14, wherein a first end of the regulating piston is connected to the line at the third pressure from the MV, and wherein a second end of the regulating piston is connected to the pump outlet so a position of the regulating piston in the regulating sleeve is based on a pressure differential between the second and third pressures.

16. The system as recited in claim 14, further comprising a shutoff valve (SOV) connected in to the regulated pressure flow line from the outlet of the PRV, wherein the SOV is configured to block flow from the PRV below a predetermined threshold for shutoff.

17. The system as recited in claim 5, wherein the controller is configured control the output splitter to maintain a first pressure schedule of the first outlet branch higher than a second pressure schedule of the second outlet branch, wherein the first pressure schedule has a low pressure that is higher than a high pressure of the second pressure schedule.

18. The system as recited in claim 5, wherein the first outlet branch is connected to supply a hydraulic actuation system.

19. The system as recited in claim 5, wherein the second outlet branch is connected to supply a gas generating system.

20. A system comprising:
a variable displacement pump (VDP) with a pump inlet and a pump outlet, wherein the VDP is configured to receive a flow at the pump inlet at a first pressure and to discharge a flow from the pump outlet at a second pressure elevated relative to the first pressure, wherein the VDP includes a variable displacement mechanism configured to vary the second pressure;
a second pump in fluid communication to receive flow at the pump inlet at the first pressure and to discharge flow from an auxiliary outlet;
a backup selector in fluid communication with the pump outlet and with the auxiliary outlet, wherein the backup selector is configured to operate in a normal mode to supply the pump outlet from the VDP and to supply the auxiliary outlet from the second pump, and wherein the backup selector is configured to switch to a backup mode to supply the pump outlet from the second pump upon failure of the VDP;

a pressure sensor operatively connected to the pump outlet to generate feedback indicative of the second pressure;

a controller operatively connected to the pressure sensor and to the variable displacement mechanism for control of the VDP;

an output splitter configured to split flow from the pump outlet to a first outlet branch and to a second outlet branch for supplying two different systems each having a different pressure schedule, wherein the output splitter is operatively connected to the controller, which is configured to control the output splitter to regulate pressure in both of the first and second outlet branches; and an electrohydraulic servo valve (EHSV), wherein the EHSV includes a first connection to the pump inlet, a second connection to the pump outlet, and a pump control line operatively connected to actuate the variable displacement mechanism, wherein the controller is operatively connected to control the EHSV to actuate the variable displacement mechanism based on feedback from the pressure sensor, and wherein the variable displacement mechanism includes a position sensor configured to generate feedback indicative of position of the variable displacement mechanism, wherein the controller is operatively connected to the position sensor to control the EHSV based on feedback from the position sensor.

\* \* \* \* \*